United States Patent
Ping et al.

(10) Patent No.: US 9,348,380 B2
(45) Date of Patent: May 24, 2016

(54) DYNAMIC THERMAL BUDGET ALLOCATION FOR MEMORY ARRAY

(71) Applicants: Zhan Ping, San Jose, CA (US); Robert Brennan, Santa Clara, CA (US); Jason Martineau, San Jose, CA (US)

(72) Inventors: Zhan Ping, San Jose, CA (US); Robert Brennan, Santa Clara, CA (US); Jason Martineau, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 176 days.

(21) Appl. No.: 14/292,768

(22) Filed: May 30, 2014

(65) Prior Publication Data

US 2015/0185813 A1   Jul. 2, 2015

Related U.S. Application Data

(60) Provisional application No. 61/921,463, filed on Dec. 28, 2013.

(51) Int. Cl.
| | |
|---|---|
| G06F 1/00 | (2006.01) |
| G06F 1/32 | (2006.01) |
| G06F 1/20 | (2006.01) |
| G06F 3/06 | (2006.01) |
| G06F 12/06 | (2006.01) |
| G06F 12/02 | (2006.01) |

(52) U.S. Cl.
CPC ............. *G06F 1/206* (2013.01); *G06F 1/329* (2013.01); *G06F 1/3221* (2013.01); *G06F 1/3225* (2013.01); *G06F 1/3268* (2013.01); *G06F 1/3275* (2013.01); *G06F 3/06* (2013.01); *G06F 12/06* (2013.01); *G06F 12/02* (2013.01); *G06F 2212/1028* (2013.01)

(58) Field of Classification Search
CPC ..................................................... G06F 1/3203
USPC ............................................................ 713/323
See application file for complete search history.

(56) References Cited

U.S. PATENT DOCUMENTS

| | | |
|---|---|---|
| 6,786,056 B2 | 9/2004 | Bash et al. |
| 6,834,811 B1 | 12/2004 | Huberman et al. |

(Continued)

*Primary Examiner* — Suresh Suryawanshi
(74) *Attorney, Agent, or Firm* — Renaissance IP Law Group LLP

(57) ABSTRACT

Embodiments of the present inventive concept relate to systems and methods for dynamically allocating and/or redistributing thermal budget to each memory group in a memory array from a total memory thermal budget based on the workload of each memory group. In this manner, the memory groups having a higher workload can receive a higher thermal budget. The allocation can be dynamically adjusted over time. Thus, the individual and overall memory group performance increases while efficiently allocating the total thermal budget. By dynamically sharing the total thermal budget of the system, the performance of the system as a whole is increased, thereby lowering, for example, the total cost of ownership (TCO) of datacenters.

23 Claims, 6 Drawing Sheets

(56) References Cited

U.S. PATENT DOCUMENTS

| | | |
|---|---|---|
| 6,925,573 B2 * | 8/2005 | Bodas ........................... 713/320 |
| 7,058,828 B2 | 6/2006 | Barr et al. |
| 7,620,480 B2 | 11/2009 | Patel et al. |
| 7,818,592 B2 * | 10/2010 | Meier et al. ................... 713/300 |
| 7,861,102 B1 | 12/2010 | Ranganathan et al. |
| 7,979,729 B2 | 7/2011 | Bletsch et al. |
| 8,001,403 B2 | 8/2011 | Hamilton et al. |
| 8,065,537 B2 | 11/2011 | Hansen |
| 8,307,224 B2 | 11/2012 | Conroy et al. |
| 8,332,679 B2 | 12/2012 | Conroy et al. |
| 8,335,123 B2 * | 12/2012 | Sprouse ........................ 365/226 |
| 8,374,730 B2 | 2/2013 | Conroy et al. |
| 8,677,051 B2 * | 3/2014 | Tanaka et al. .................... 711/5 |
| 9,088,951 B2 * | 7/2015 | Barrett et al. ........................ 1/1 |
| 2005/0138440 A1 | 6/2005 | Barr et al. |
| 2010/0211669 A1 | 8/2010 | Dalgas et al. |
| 2011/0161712 A1 | 6/2011 | Athalye et al. |
| 2012/0023351 A1 * | 1/2012 | Wakrat et al. ................ 713/322 |

* cited by examiner

DYNAMIC THERMAL BUDGET ALLOCATION FOR MEMORY ARRAY

RELATED APPLICATION DATA

This application claims the benefit of, commonly-owned U.S. Provisional Patent Application Ser. No. 61/921,463, filed Dec. 28, 2013, which is hereby incorporated by reference.

BACKGROUND

The present inventive concepts relate to systems having memory arrays, and more particularly, to methods and systems for dynamically allocating thermal budgets for systems containing multiple memory groups.

Memory is a fundamental component of computers and computing. For example, a computer server can have multiple memory modules, memory arrays, memory groups, external memory units such as memory array boxes, or the like. By way of another example, mobile devices can have multiple embedded memory chips. In conventional systems that have memory groups, each memory group has its own fixed fraction of a total thermal budget. Each memory group evenly shares the total thermal budget, and each share is permanently fixed. The total thermal budget is based on worst case predictions and evaluations. System designers design for worst case to reserve thermal budget for each memory group. A fixed thermal budget, or thermal design power (TDP), plus a guard band, is used in attempts to ensure sufficient and stable operation.

But for most cases, the load on each memory group is not evenly distributed. In other words, one memory group might have a high load and may reach the thermal budget limit for its fraction of the total thermal budget, while another memory group in the same system with low load might have extra unused thermal budget. As a result, thermal budget is wasted and the dynamic performance of the system is limited because of the unused thermal budget margins.

What is needed is a technique for dynamically redistributing the thermal budget to each memory group from the total memory thermal budget based on the workload of each memory group. Together with related inventive concepts disclosed herein, these and other limitations in the prior art are addressed.

BRIEF SUMMARY

Inventive concepts may include a method for dynamically allocating a thermal budget for a memory system or a system having memory. The method may include assigning an equal number of credits to each of a plurality of memory groups in the memory array, detecting, using one or more voltage regulators or other suitable detection or measurement means, at least one of an amount of current or power being consumed by each of the plurality of memory groups. The measurement means can include, for example, a current detector or measurement device, an ohm detector or measurement device, a temperature sensor, a voltage detector or measurement device, or the like. The method may include determining, by dynamic thermal budget logic, whether the amount of current or power being consumed by a particular memory group from among the plurality of memory groups is approaching, is at, or exceeds the assigned number of credits for the particular memory group, and when it is determined that the amount of current or power being consumed by the particular memory group is approaching, is at, or exceeds the assigned number of credits for the particular memory group, assigning an increased number of credits to the particular memory group and reducing throttling of the particular memory group, and determining, by the dynamic thermal budget logic, whether the amount of current or power being consumed by a particular memory group from among the plurality of memory groups is less than the assigned number of credits for the particular memory group, and when it is determined that the amount of current or power being consumed by the particular memory group is less than the assigned number of credits for the particular memory group, assigning a decreased number of credits to the particular memory group and increasing throttling of the particular memory group.

The method may further include, after a predetermined period of time: detecting, using the one or more voltage regulators or other suitable detection or measurement means, at least one of a second amount of current or power being consumed by each of the plurality of memory groups, determining, by the dynamic thermal budget logic, whether the second amount of current or power being consumed by a particular memory group from among the plurality of memory groups is approaching, is at, or exceeds the assigned number of credits for the particular memory group, when it is determined that the second amount of current or power being consumed by the particular memory group is approaching, is at, or exceeds the assigned number of credits for the particular memory group, assigning an increased number of credits to the particular memory group and reducing throttling of the particular memory group, determining, by the dynamic thermal budget logic, whether the second amount of current or power being consumed by a particular memory group from among the plurality of memory groups is less than the assigned number of credits for the particular memory group, and when it is determined that the second amount of current or power being consumed by the particular memory group is less than the assigned number of credits for the particular memory group, assigning a decreased number of credits to the particular memory group and increasing throttling of the particular memory group.

The method may further include, for a plurality of fixed periods of time, periodically repeating the detecting of the current or power being consumed by the memory groups, the determining by the dynamic thermal budget logic whether the amount of current or power being consumed is approaching, is at, or exceeds the assigned number of credits, and the determining by the dynamic thermal budget logic whether the amount of current or power being consumed is less than the assigned number of credits. Each of the plurality of fixed periods of time may be 20 microseconds or greater.

Determining whether the amount of current or power being consumed is approaching, is at, or exceeds the assigned number of credits may further include determining, by the dynamic thermal budget logic, whether an amount of current or power being consumed by a first memory group from among the plurality of memory groups is approaching, is at, or exceeds the assigned number of credits for the first memory group, and determining, by the dynamic thermal budget logic, whether an amount of current or power being consumed by a second memory group from among the plurality of memory groups is approaching, is at, or exceeds the assigned number of credits for the second memory group.

The method may further include when it is determined that the amount of current or power being consumed by the first memory group is approaching, is at, or exceeds the assigned number of credits for the first memory group, assigning an increased number of credits to the first memory group and reducing throttling of the first memory group, when it is determined that the amount of current or power being consumed by the second memory group is approaching, is at, or exceeds the assigned number of credits for the second memory group, assigning an increased number of credits to the second memory group and reducing throttling of the second memory group, when it is determined that the amount of current or power being consumed by the first memory group is less than the assigned number of credits for the first memory group, assigning a decreased number of credits to the first memory group and increasing throttling of the first memory group, and when it is determined that the amount of current or power being consumed by the second memory group is less than the assigned number of credits for the second memory group, assigning a decreased number of credits to the second memory group and increasing throttling of the second memory group.

In some embodiments, increasing the throttling of the particular memory group further comprises increasing, by a switch, the throttling of the particular memory group. In some embodiments, decreasing the throttling of the particular memory group further comprises decreasing, by a switch, the throttling of the particular memory group.

In some embodiments, the method includes controlling a temperature of the plurality of memory groups to substantially remain within the thermal budget based at least on the assigning of the credits, and/or controlling a temperature of the plurality of memory groups to substantially remain within the thermal budget based at least on the throttling.

The method may further include predictively distributing the credits and distributing heat across various physical locations and/or memory array within the memory system according to the predictively distributed credits.

The method may further include resetting the thermal budget so that each memory group is allocated a pre-determined quantity or fraction of the thermal budget, and re-allocating the thermal budget across the various memory groups according to the instant current or power consumption or temperature of each memory group.

Embodiments of the inventive concept may also include a system for dynamically allocating a thermal budget for a memory array. The system may include a plurality of memory groups in the memory array, a switch coupled to each of the plurality of memory groups, dynamic thermal budget logic coupled to the switch and configured to assign an equal number of credits to each of the plurality of memory groups in the memory array, and one or more voltage regulators or other suitable measurement means coupled to the dynamic thermal budget logic and configured to detect at least one of an amount of current or power being consumed by each of the plurality of memory groups. The dynamic thermal budget logic can be configured to determine whether the amount of current or power being consumed by a particular memory group from among the plurality of memory groups is approaching, is at, or exceeds the assigned number of credits for the particular memory group. In response to determining that the amount of current or power being consumed by the particular memory group is approaching, is at, or exceeds the assigned number of credits for the particular memory group, the dynamic thermal budget logic can be configured to assign an increased number of credits to the particular memory group, and the switch is configured to decrease throttling of the particular memory group. The dynamic thermal budget logic can be configured to determine whether the amount of current or power being consumed by a particular memory group from among the plurality of memory groups is less than the assigned number of credits for the particular memory group. In response to determining that the amount of current or power being consumed by the particular memory group is less than the assigned number of credits for the particular memory group, the dynamic thermal budget logic can be configured to assign a decreased number of credits to the particular memory group, and the switch can be configured to increase throttling of the particular memory group.

Embodiments of the inventive concept may also include a system, including a bus, a memory array coupled to the bus, a plurality of memory groups in the memory array, a switch coupled to each of the plurality of memory groups, dynamic thermal budget logic coupled to the switch and configured to assign an equal number of credits to each of the plurality of memory groups in the memory array, and one or more voltage regulators or other suitable measurement means coupled to the dynamic thermal budget logic and configured to detect at least one of an amount of current or power being consumed by each of the plurality of memory groups.

Certain of the inventive features may be best achieved by implementing them in a system such as a computer server or desktop computer. Other types of memory devices and/or application specific integrated circuits (ASICs) can implement the inventive principles disclosed herein. The inventive concepts may be implemented within memory array units and/or memory modules of a variety of mobile devices such as smart phones, tablets, notebook computers, or the like, or in a variety of stationary devices such as desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first thermal budget could be termed a second thermal budget, and, similarly, a second thermal budget could be termed a first thermal budget, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the present inventive concept relate to systems and methods for dynamically allocating and/or redistributing thermal budget to each memory group in a memory array from a total memory thermal budget based on the workload of each memory group. In this manner, the memory groups having a higher workload can receive a higher thermal budget. The allocation can be dynamically adjusted over time. Thus, the individual and overall memory group performance increases while efficiently allocating the total thermal budget. By dynamically sharing the total thermal budget of the system, the performance of the system as a whole is increased, thereby lowering, for example, the total cost of ownership (TCO) of datacenters.

Figure 1:
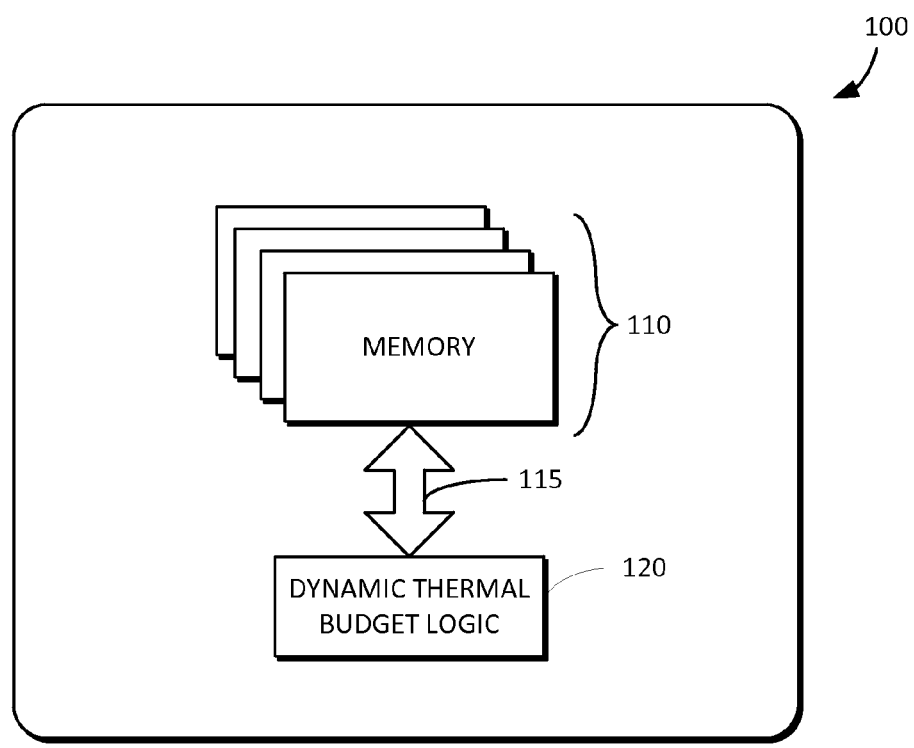
FIG. 1 is an example diagram of a system including a memory array coupled to dynamic thermal budget logic in accordance with embodiments of the inventive concept.

FIG. 1 is an example diagram of a system 100 including a memory array 110 coupled to dynamic thermal budget logic 120 via one or more communication links 115 in accordance with embodiments of the inventive concept. The dynamic thermal budget logic 120 can coordinate the dynamic thermal budget allocation for each of the memory groups in the memory array 110, as further described in detail below.

Figure 2A:
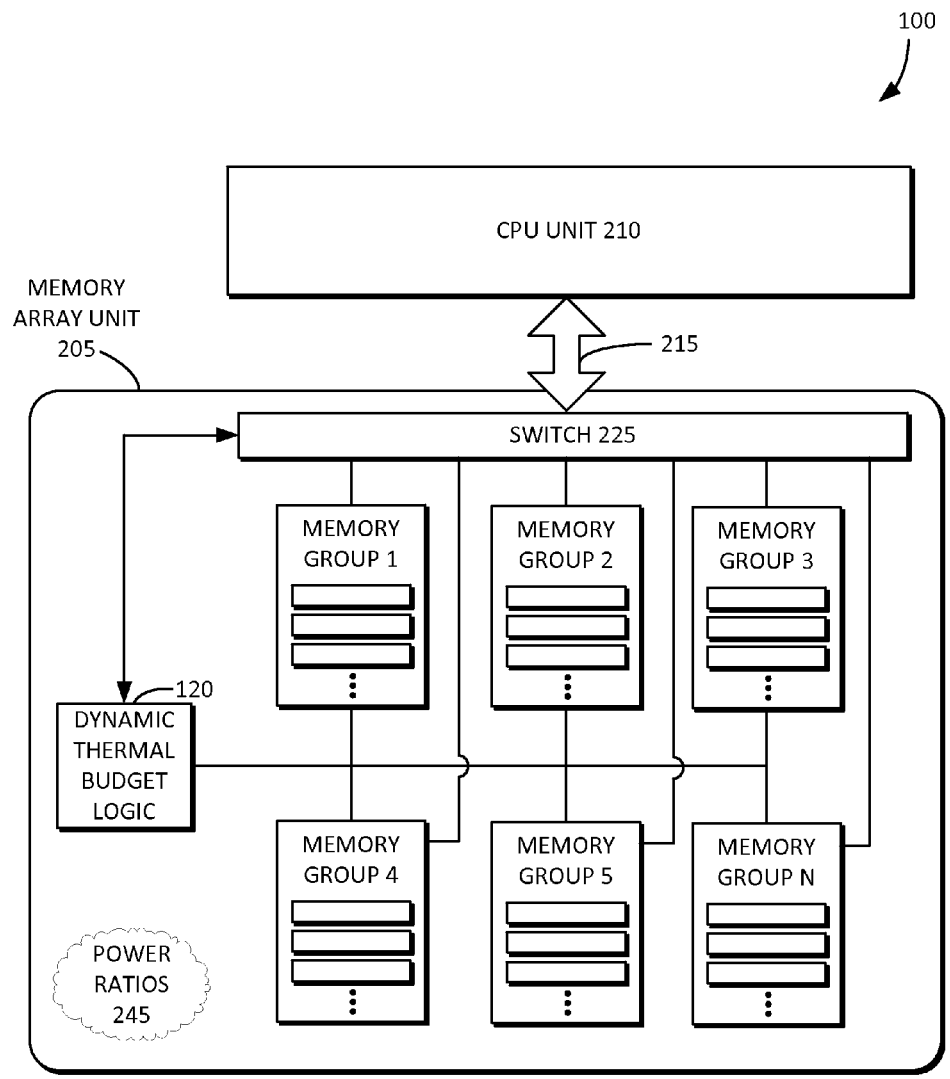
FIG. 2A is a more detailed example diagram of the system of FIG. 1 in accordance with embodiments of the inventive concept.

FIG. 2A is a more detailed example diagram of the system 100 of FIG. 1 in accordance with embodiments of the inventive concept. The system 100 may include, for example, a CPU unit 210, which may include one or more processors. The CPU unit 210 may be coupled to a memory array unit 205. The memory array unit 205 can include a switch 225, dynamic thermal budget logic 120, and multiple memory groups (e.g., memory groups 1 through N). Each memory group may include one or more memory modules or chips. The switch 225 may be coupled to each of the memory groups. The dynamic thermal budget logic 120 may be coupled to each of the memory groups and to the switch 225.

Figure 2B:
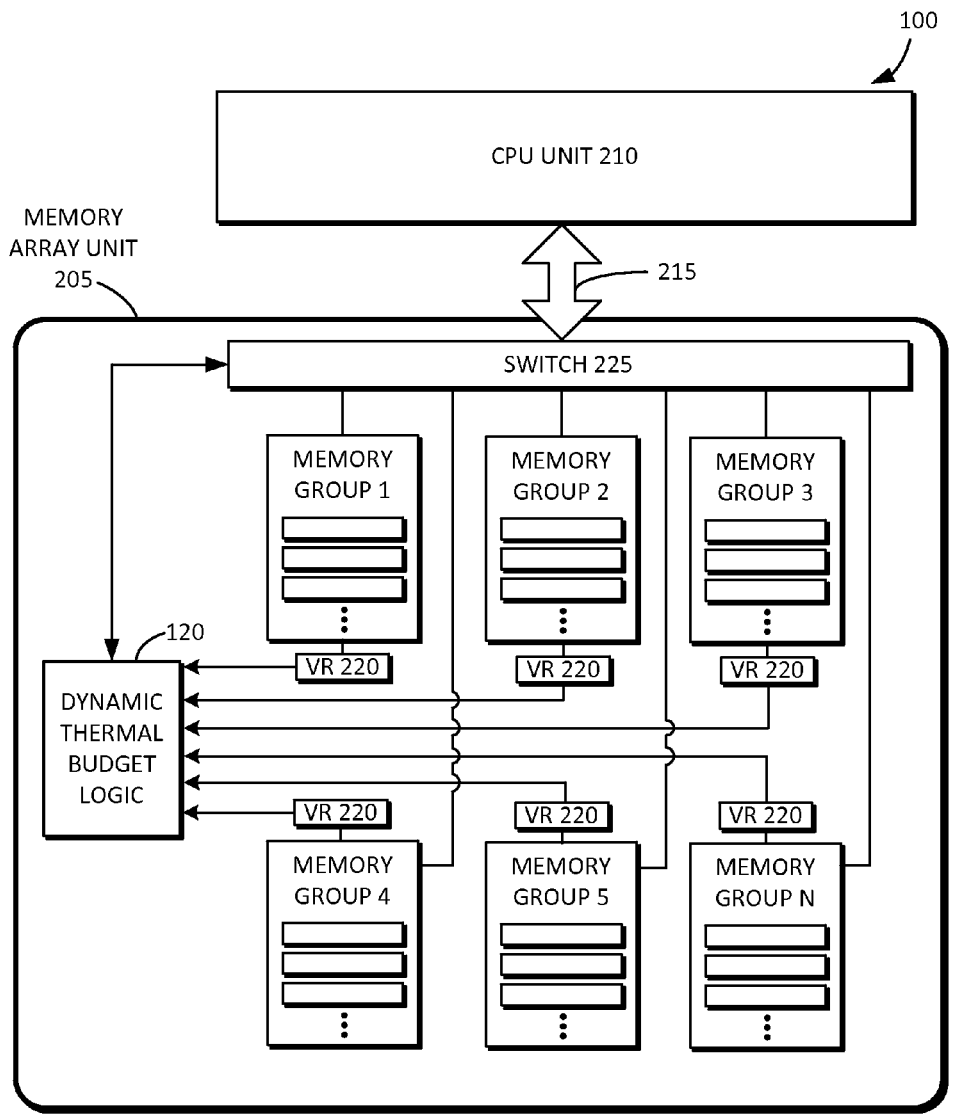
FIG. 2B is another more detailed example diagram of the system of FIG. 1 in accordance with embodiments of the inventive concept.

FIG. 2B is another detailed example diagram of the system 100 of FIG. 1 in accordance with embodiments of the inventive concept. The system shown in FIG. 2B is similar to the one shown in FIG. 2A with the notable difference that each memory group may have associated therewith a voltage regulator (VR) controller 220. Each of the VR controllers 220 may be coupled to a corresponding one of the memory groups and to the dynamic thermal budget logic 120. It will be understood that a single or multiple voltage regulator controllers can be used. In other words, in some embodiments, a single voltage regulator controller may provide instant current and/or power consumption information to the dynamic thermal budget logic 120. Other suitable measurement means can be used, such as a current detector or measurement device, an ohm detector or measurement device, a temperature sensor, a voltage detector or measurement device, or the like.

The dynamic thermal budget logic 120 can receive the current and/or power measurement information from each voltage regulator controller or other measurement means, and determine the instant current consumption and/or power consumption information for each memory group. Where the dynamic thermal budget logic 120 gets the current consumption information, it can calculate the power consumption from the current consumption information. The dynamic thermal budget logic 120 can receive and/or process the instant power consumption information. Based on the instant power consumption measurements for each memory group, the dynamic thermal budget logic 120 can transmit credits to the memory groups 1 through N. The credits can be adjusted to be increased or decreased dynamically over time. The credits can be assigned, for example, every 20 microseconds (μs).

In other words, for every fixed period of time (e.g., 20 μs), the dynamic thermal budget logic 120 can detect and/or determine the instant power consumption of each memory group, determine the number of credits for each memory group, and allocate those credits so that the memory groups with relatively more load or activity receive a higher allocation of the overall thermal budget than the memory groups with relatively less load or activity. Each credit can represent some portion of the total allowable thermal budget. With a higher allocation of the thermal budget, those memory groups can operate at a higher power consumption level—higher than would typically be possible with conventional design techniques—and without causing the overall thermal budget to be exceeded. It will be understood that the period of time can be 20 μs or greater. It will also be understood that any suitable fixed period of time can be used.

More specifically, the dynamic thermal budget logic 120 can assign, at least initially, an equal number of credits to each of the memory groups in the memory array. One or more of the voltage regulators 220 can detect an amount of current and/or power being consumed by each of the memory groups. The dynamic thermal budget logic 120 can determine whether the amount of current or power being consumed by a particular memory group is approaching, is at, or exceeds the assigned number of credits for the particular memory group. In response to determining that the amount of current or power being consumed by the particular memory group is approaching, is at, or exceeds the assigned number of credits for the particular memory group, the dynamic thermal budget logic 120 can assign an increased number of credits to the particular memory group, and the switch 225 can decrease throttling of the particular memory group.

The dynamic thermal budget logic 120 can determine whether the amount of current or power being consumed by a particular memory group is less than the assigned number of credits for the particular memory group. In response to determining that the amount of current or power being consumed by the particular memory group is less than the assigned number of credits for the particular memory group, the dynamic thermal budget logic 120 can assign a decreased number of credits to the particular memory group, and the switch 225 can increase throttling of the particular memory group.

The increase and reduction of the credits to the various memory groups is performed in such a manner that the total thermal budget of the memory array unit 205 for the various memory groups is not exceeded. In other words, an increase in credits to a particular memory group that has relatively high instant power consumption may result in a decrease to another memory group that has a relatively low instant power consumption. The total thermal budget is therefore distributed unevenly across the various memory groups according to their workload. Such uneven distribution is periodically modified over time so that the thermal budget is allocated efficiently and accurately according to the changing circumstances. That is, a low credit user can give or otherwise make available credits to a high credit user from within a pool of credits.

For example, the one or more voltage regulators 220 or other measurement means can detect, after a predetermined period of time, a second amount of current or power being consumed by each of the memory groups. The dynamic thermal budget logic 120 can determine, after the predetermined period of time, whether the second amount of current or power being consumed by a particular memory group is approaching, is at, or exceeds the assigned number of credits for the particular memory group. In response to determining that the second amount of current or power being consumed by the particular memory group is approaching, is at, or exceeds the assigned number of credits for the particular memory group, the dynamic thermal budget logic 120 can assign an increased number of credits to the particular memory group, and the switch can decrease throttling of the particular memory group.

The dynamic thermal budget logic 120 can determine whether the second amount of current or power being consumed by a particular memory group is less than the assigned number of credits for the particular memory group. In response to determining that the second amount of current or power being consumed by the particular memory group is less than the assigned number of credits for the particular memory group, the dynamic thermal budget logic 120 can assign a decreased number of credits to the particular memory group. The switch can increase throttling of the particular memory group.

The dynamic thermal budget logic 120 can control a temperature of the memory groups to substantially remain within the thermal budget based at least on the assignment of the credits and/or the throttling. By unevenly allocating credits across the various memory groups, the system's behavior is impacted because each memory group can operate at different load levels and still remain within an overall thermal budget. In other words, the thermal budget is tailored to the individual demands of each memory group, while still keeping within the limitations of the system as a whole.

Figure 3:
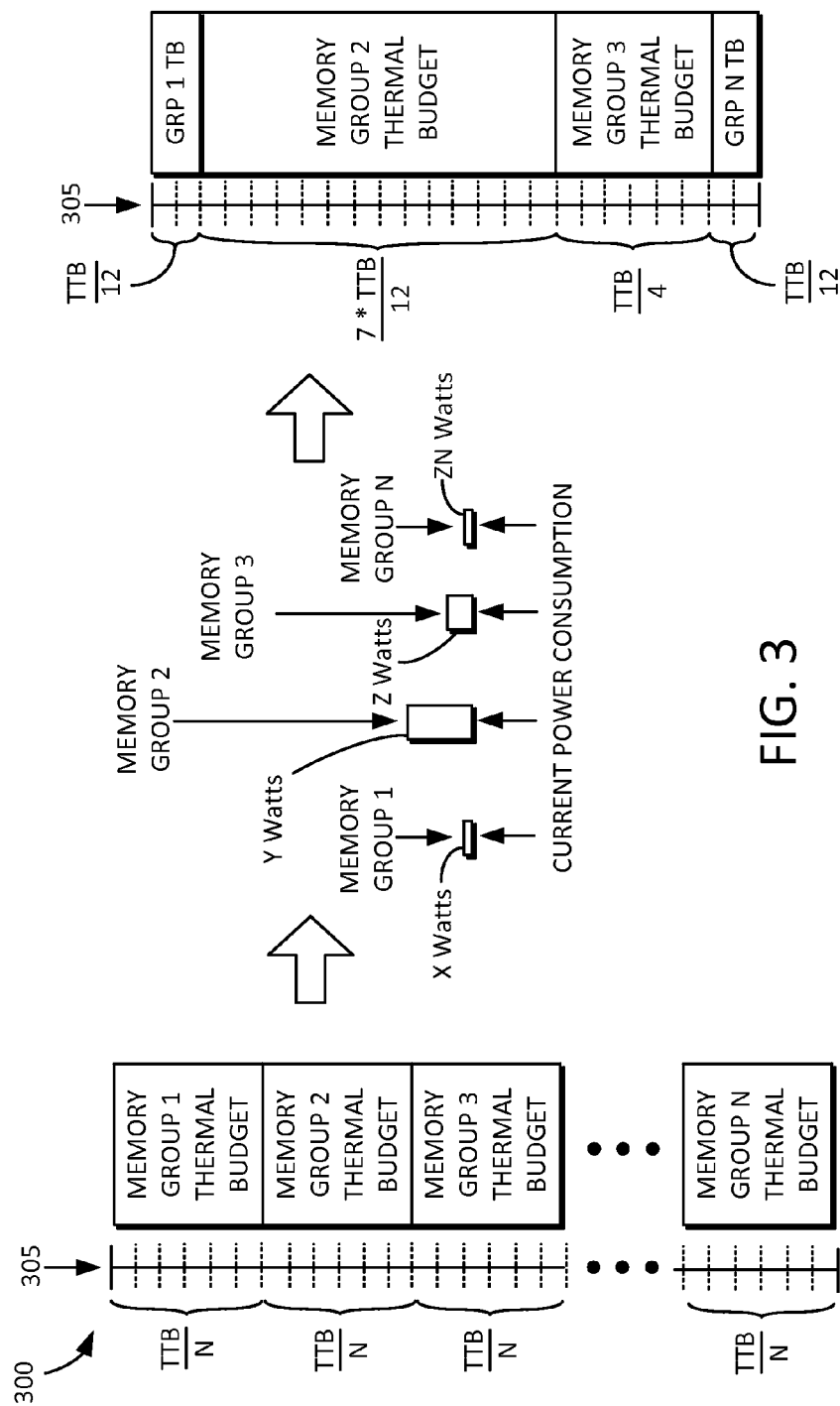
FIG. 3 is an example diagram of a technique for dynamically allocating thermal budget in accordance with embodiments of the inventive concept.

FIG. 3 is an example diagram 300 of a technique for dynamically allocating thermal budget in accordance with embodiments of the inventive concept. Although four memory groups are illustrated in FIG. 3 (i.e., memory groups 1, 2, 3, and N), it will be understood that any suitable number of memory groups can be used and still fall within the inventive concepts disclosed herein. The total thermal budget can be predetermined. In other words, the total thermal budget can be defined or calculated in advance, and can be a fixed quantity. The total thermal budget of the memory array unit can be initially divided evenly across the various memory groups 1 through N. For example, each memory group can initially be assigned a fraction of the total thermal budget (TTB). In other words, each memory group can initially be assigned TTB/N of the total thermal budget.

The one or more voltage regulators (e.g., 220 of FIGS. 2A and 2B) or other suitable measurement means can sense the instant current and/or power consumption of each memory group. The dynamic thermal budget logic 120 can receive and/or process such information. For example, memory group 1 may have an instant power consumption of X Watts, memory group 2 may have an instant power consumption of Y Watts, memory group 3 may have an instant power consumption of Z Watts, and memory group N may have an instant power consumption of ZN Watts. X, Y, Z and ZN can be any suitable measured integer or number of Watts based on the workload of each memory group.

By way of example, if X is 10 Watts, Y is 70 Watts, Z is 30 Watts, and ZN is 10 Watts, then the total instant power consumption of all of the memory groups is 120 Watts. The dynamic thermal budget logic 120 can assign 1/12 (i.e., 10/120) of the credits 305 to memory group 1. The dynamic thermal budget logic 120 can assign 7/12 (i.e., 70/120) of the credits 305 to memory group 2. The dynamic thermal budget logic 120 can assign 1/4 (i.e., 30/120) of the credits 305 to memory group 3. And the dynamic thermal budget logic 120 can assign 1/12 (i.e., 10/120) of the credits 305 to memory group N. The amount of throttling by the switch 225 can also be increased and/or decreased accordingly. As the dynamic load on the various memory groups changes over time, the dynamic thermal budget logic 120 can readjust the allocation of credits to each of the memory groups. The dynamic thermal budget logic 120 can transmit allocation information to the switch 225, which can adjust the throttling based at least on the allocation of credits by the dynamic thermal budget logic 120.

By way of further explanation, if the current credit ratios are 1/12, 7/12, and 3/12, and 1/12, respectively, the ratios may remain unchanged on the next measurement if all of the memory groups are meeting their credit cap. In alternative embodiments, the credit ratios may gradually be returned toward an even credit distribution over time. Moreover, where a particular memory group may have been assigned a zero (0) value (e.g., for being shut off or otherwise not having any significant load or activity) for its fraction of the thermal budget, the particular memory group may be brought back into the overall thermal budget determination based on the system's current demand and load distribution, rather than solely based on the memory group's past use. In some embodiments, the dynamic thermal budget logic 120 can "reset" the total thermal budget by reverting the allocation to the initial state (or any other pre-defined state), e.g., divided evenly among the various memory groups. In other words, the thermal budget can be reset so that each memory group is allocated a same quantity or fraction of the total thermal budget. The dynamic thermal budget logic 120 can then proceed with re-allocating the thermal budget across the various memory groups according to the instant power consumption or temperature of each memory group.

Figure 4:
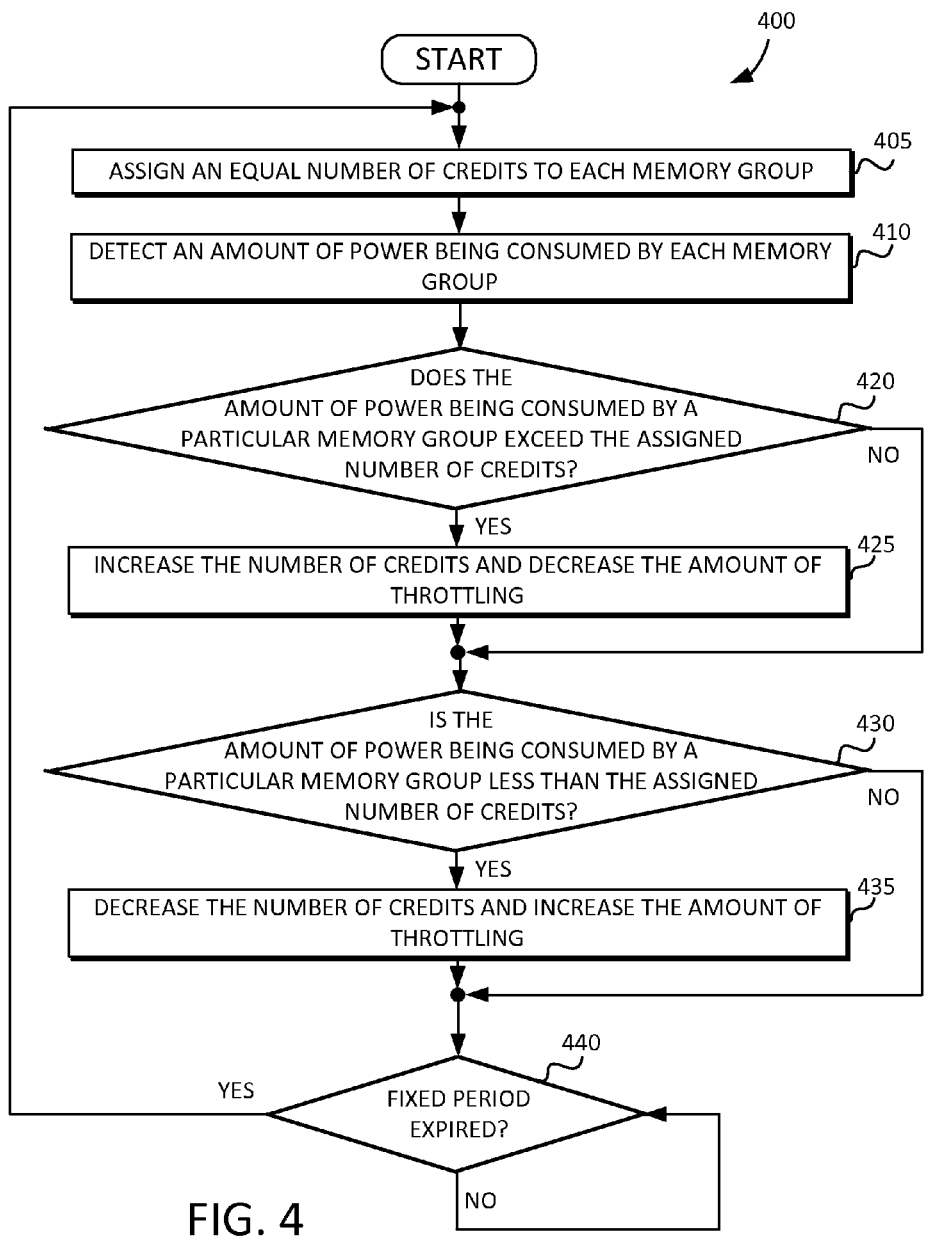
FIG. 4 is a flow diagram illustrating a technique for dynamically allocating thermal budget in a system having a memory array in accordance with embodiments of the inventive concept.

FIG. 4 is a flow diagram 400 illustrating a technique for dynamically allocating thermal budget in a system having a memory array in accordance with embodiments of the inventive concept. The technique begins at 405, where an equal number of credits is assigned to each memory group. The flow proceeds to 410 where an amount of power being consumed by each memory is detected or otherwise determined.

At 420, another determination is made whether the amount of power being consumed by a particular memory group is approaching, is at, or exceeds the assigned number of credits for the particular memory group. If YES, the flow proceeds to 425, where the number of credits for the particular memory group is increased, and the amount of throttling for the particular memory group is decreased. Otherwise, if NO, meaning that the instant power being consumed by a particular memory group is less than or equal to the assigned number of credits, then the flow proceeds directly to 430.

A determination is made at 430 whether the amount of power being consumed by a particular memory group is less than the assigned number of credits for the particular memory group. If YES, the flow proceeds to 435, where the number of credits for the particular memory group is decreased, and the amount of throttling for the particular memory group is increased. Otherwise, if NO, meaning that the instant power being consumed by a particular memory group is equal to or exceeds the assigned number of credits, then the flow proceeds directly to 440.

Yet another determination is made at 440 whether a fixed period has expired. If NO, the dynamic thermal budget logic can wait until the current period of time has elapsed. If YES, the flow returns to 405 for further measurements and allocations of credits so that the distribution of thermal budget credits to the various memory groups is dynamically changed over time.

The inventive concepts disclosed herein are not limited to aggregated memory array systems, but rather, can also be applied to all types of disaggregated memory array systems. Such memory array systems can include DRAM, MRAM, PCM, Flash memory, or the like. In addition, the dynamic thermal budget allocation techniques can be based on neural networking or genetic techniques, which can be used to assist the dynamic credit allocation using self learning and optimization features. Such techniques can predict distributions based on perceived workload and can also be used to spread hotspots around the server.

Figure 5:
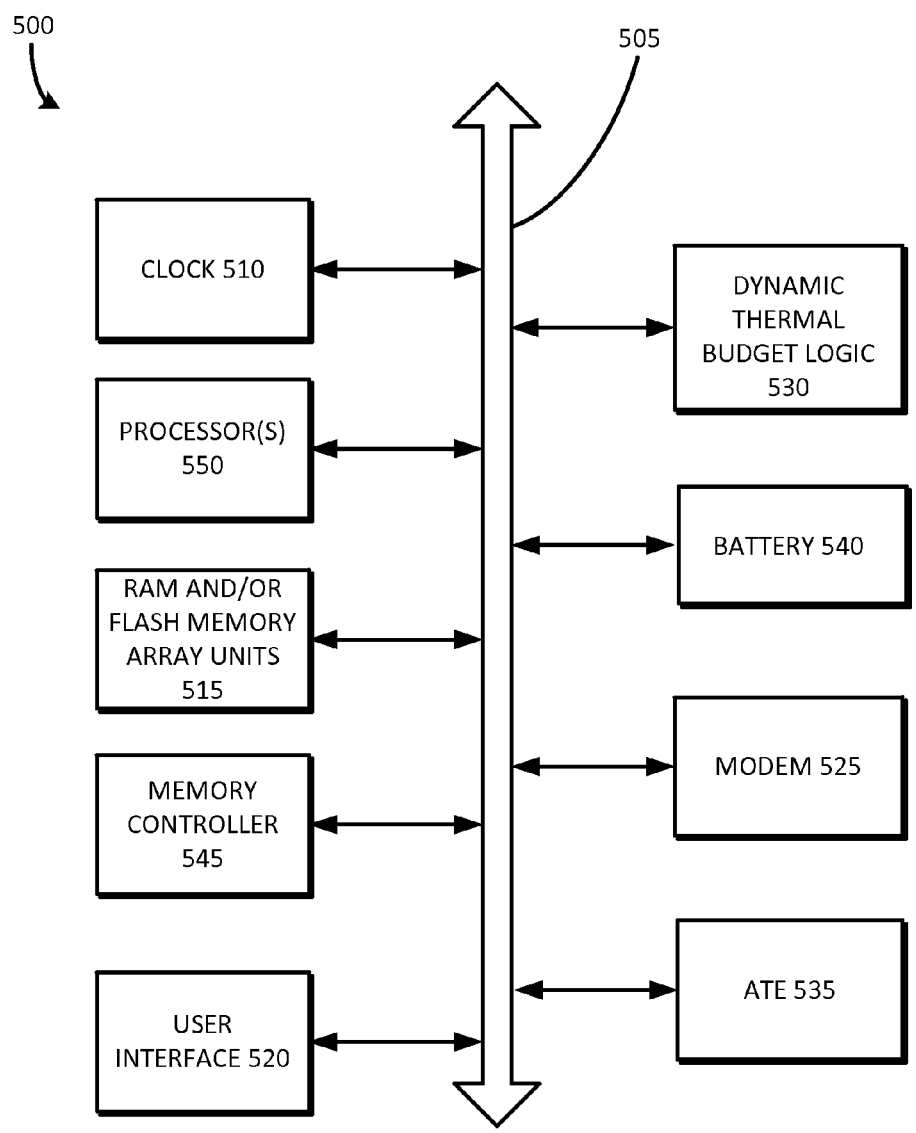
FIG. 5 is an example block diagram of a computing system including dynamic thermal budget logic according to embodiments of the inventive concept as disclosed herein.

FIG. 5 is an example block diagram of a computing system 500 including dynamic thermal budget logic 530 according to embodiments of the inventive concept as disclosed herein. The dynamic thermal budget logic 530 may be communicatively connected to a system bus 505. The computing system 500 may also include a clock 510, one or more processors 550, a random access memory (RAM) and/or flash memory array unit(s) 515, a memory controller 545, a user interface 520, a modem 525 such as a baseband chipset, and/or automated test equipment (ATE) 535, any or all of which may be electrically coupled to the system bus 505.

If the computing system 500 is a mobile device, it may further include a battery 540, which powers the computing system 500. Although not shown in FIG. 5, the computing system 500 may further include an application chipset, a camera image processor (CIS), a mobile DRAM, and the like. The memory controller 545 and the flash memory 515 may constitute a solid state drive/disk (SSD), which uses a non-volatile memory to store data.

In example embodiments, the computing system 500 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A method for dynamically allocating a thermal budget for a memory array, the method comprising:
   assigning an equal number of credits to each of a plurality of memory groups in the memory array;
   detecting at least one of an amount of current or power being consumed by each of the plurality of memory groups;
   determining, by the dynamic thermal budget logic, whether the amount of current or power being consumed by a particular memory group from among the plurality of memory groups is less than the assigned number of credits for the particular memory group;
   when it is determined that the amount of current or power being consumed by the particular memory group is less than the assigned number of credits for the particular memory group, assigning a decreased number of credits to the particular memory group and increasing throttling of the particular memory group;
   determining, by dynamic thermal budget logic, whether the amount of current or power being consumed by a particular memory group from among the plurality of memory groups is approaching, is at, or exceeds the assigned number of credits for the particular memory group; and
   when it is determined that the amount of current or power being consumed by the particular memory group is approaching, is at, or exceeds the assigned number of credits for the particular memory group, assigning an increased number of credits to the particular memory group and reducing throttling of the particular memory group.

2. The method of claim 1, further comprising:
   after a predetermined period of time:
   detecting at least one of a second amount of current or power being consumed by each of the plurality of memory groups;
   determining, by the dynamic thermal budget logic, whether the second amount of current or power being consumed by a particular memory group from among the plurality of memory groups is less than the assigned number of credits for the particular memory group;
   when it is determined that the second amount of current or power being consumed by the particular memory group is less than the assigned number of credits for the particular memory group, assigning a decreased number of credits to the particular memory group and increasing throttling of the particular memory group;
   determining, by the dynamic thermal budget logic, whether the second amount of current or power being consumed by a particular memory group from among the plurality of memory groups is approaching, is at, or exceeds the assigned number of credits for the particular memory group; and
   when it is determined that the second amount of current or power being consumed by the particular memory group is approaching, is at, or exceeds the assigned number of credits for the particular memory group, assigning an increased number of credits to the particular memory group and reducing throttling of the particular memory group.

3. The method of claim 1, further comprising:
   predictively distributing the credits;
   distributing heat across various physical locations of the memory array according to the predictively distributed credits; and
   for a plurality of fixed periods of time, periodically repeating the detecting of at least one of the amount of current or power being consumed by each of the plurality of memory groups, the determining by the dynamic thermal budget logic whether the amount of current or power being consumed is approaching, is at, or exceeds the assigned number of credits, and the determining by the dynamic thermal budget logic whether the amount of current or power being consumed is less than the assigned number of credits.

4. The method of claim 3, wherein each of the plurality of fixed periods of time is 20 microseconds or greater.

5. The method of claim 1, wherein determining whether the amount of current or power being consumed is approaching, is at, or exceeds the assigned number of credits further comprises:
   determining, by the dynamic thermal budget logic, whether an amount of current or power being consumed by a first memory group from among the plurality of memory groups is approaching, is at, or exceeds the assigned number of credits for the first memory group; and
   determining, by the dynamic thermal budget logic, whether an amount of current or power being consumed by a second memory group from among the plurality of memory groups is approaching, is at, or exceeds the assigned number of credits for the second memory group.

6. The method of claim 5, further comprising:
   when it is determined that the amount of current or power being consumed by the first memory group is less than the assigned number of credits for the first memory group, assigning a decreased number of credits to the first memory group and increasing throttling of the first memory group;
   when it is determined that the amount of current or power being consumed by the second memory group is less than the assigned number of credits for the second memory group, assigning a decreased number of credits to the second memory group and increasing throttling of the second memory group;
   when it is determined that the amount of current or power being consumed by the first memory group is approaching, is at, or exceeds the assigned number of credits for the first memory group, assigning an increased number of credits to the first memory group and reducing throttling of the first memory group; and
   when it is determined that the amount of current or power being consumed by the second memory group is approaching, is at, or exceeds the assigned number of credits for the second memory group, assigning an increased number of credits to the second memory group and reducing throttling of the second memory group.

7. The method of claim 1, wherein increasing the throttling of the particular memory group further comprises:

increasing, by a switch, the throttling of the particular memory group.

8. The method of claim 1, wherein decreasing the throttling of the particular memory group further comprises:
decreasing, by a switch, the throttling of the particular memory group.

9. The method of claim 1, further comprising:
controlling a temperature of the plurality of memory groups to substantially remain within the thermal budget based at least on the assigning of the credits.

10. The method of claim 1, further comprising:
controlling a temperature of the plurality of memory groups to substantially remain within the thermal budget based at least on the throttling.

11. The method of claim 1, further comprising:
resetting the thermal budget so that each memory group is allocated a pre-determined quantity or fraction of the thermal budget; and
re-allocating the thermal budget across the various memory groups according to the instant power consumption or temperature of each memory group.

12. A system for dynamically allocating a thermal budget for a memory array, the system comprising:
a plurality of memory groups in the memory array;
a switch coupled to each of the plurality of memory groups;
dynamic thermal budget logic coupled to the switch and configured to assign an equal number of credits to each of the plurality of memory groups in the memory array; and
measurement means coupled to the dynamic thermal budget logic and configured to detect at least one of an amount of current or power being consumed by each of the plurality of memory groups,
wherein the dynamic thermal budget logic is configured to determine whether the amount of current or power being consumed by a particular memory group from among the plurality of memory groups is less than the assigned number of credits for the particular memory group,
wherein in response to determining that the amount of current or power being consumed by the particular memory group is less than the assigned number of credits for the particular memory group, the dynamic thermal budget logic is configured to assign a decreased number of credits to the particular memory group, and the switch is configured to increase throttling of the particular memory group,
wherein the dynamic thermal budget logic is configured to determine whether the amount of current or power being consumed by a particular memory group from among the plurality of memory groups is approaching, is at, or exceeds the assigned number of credits for the particular memory group, and
wherein in response to determining that the amount of current or power being consumed by the particular memory group is approaching, is at, or exceeds the assigned number of credits for the particular memory group, the dynamic thermal budget logic is configured to assign an increased number of credits to the particular memory group, and the switch is configured to decrease throttling of the particular memory group.

13. The system of claim 12, wherein:
the measurement means is configured to detect, after a predetermined period of time, at least one of a second amount of current or power being consumed by each of the plurality of memory groups,
the dynamic thermal budget logic is configured to determine whether the second amount of current or power being consumed by a particular memory group from among the plurality of memory groups is less than the assigned number of credits for the particular memory group,
in response to determining that the second amount of current or power being consumed by the particular memory group is less than the assigned number of credits for the particular memory group, the dynamic thermal budget logic is configured to assign a decreased number of credits to the particular memory group, and the switch is configured to increase throttling of the particular memory group,
the dynamic thermal budget logic is configured to determine, after the predetermined period of time, whether the second amount of current or power being consumed by a particular memory group from among the plurality of memory groups is approaching, is at, or exceeds the assigned number of credits for the particular memory group, and
in response to determining that the second amount of current or power being consumed by the particular memory group is approaching, is at, or exceeds the assigned number of credits for the particular memory group, the dynamic thermal budget logic is configured to assign an increased number of credits to the particular memory group, and the switch is configured to decrease throttling of the particular memory group.

14. The system of claim 12, wherein:
the dynamic thermal budget logic is configured to determine whether an amount of current or power being consumed by a first memory group from among the plurality of memory groups is approaching, is at, or exceeds the assigned number of credits for the first memory group, and
the dynamic thermal budget logic is configured to determine whether an amount of current or power being consumed by a second memory group from among the plurality of memory groups is approaching, is at, or exceeds the assigned number of credits for the second memory group.

15. The system of claim 14, wherein:
in response to determining that the amount of current or power being consumed by the first memory group is less than the assigned number of credits for the first memory group, the dynamic thermal budget logic is configured to assign a decreased number of credits to the first memory group, and the switch is configured to increase throttling of the first memory group,
in response to determining that the amount of current or power being consumed by the second memory group is less than the assigned number of credits for the second memory group, the dynamic thermal budget logic is configured to assign a decreased number of credits to the second memory group, and the switch is configured to increase throttling of the second memory group,
in response to determining that the amount of current or power being consumed by the first memory group is approaching, is at, or exceeds the assigned number of credits for the first memory group, the dynamic thermal budget logic is configured to assign an increased number of credits to the first memory group, and the switch is configured to decrease throttling of the first memory group, and
in response to determining that the amount of current or power being consumed by the second memory group is approaching, is at, or exceeds the assigned number of credits for the second memory group, the dynamic thermal budget logic is configured to assign an increased number of credits to the second memory group, and the switch is configured to decrease throttling of the second memory group.

16. The system of claim 12, wherein:
the dynamic thermal budget logic is configured to control a temperature of the plurality of memory groups to substantially remain within the thermal budget based at least on the assignment of the credits.

17. The system of claim 12, wherein:
the dynamic thermal budget logic is configured to control a temperature of the plurality of memory groups to substantially remain within the thermal budget based at least on the throttling.

18. The system of claim 12, wherein:
the dynamic thermal budget logic is configured to predictively distribute the credits,
the dynamic thermal budget logic is configured to distribute heat across various physical locations of the memory array according to the predictively distributed credits, and
the dynamic thermal budget logic is configured to, for a plurality of fixed periods of time, periodically repeat the detecting of the current or power being consumed by each of the plurality of memory groups, the determining by the dynamic thermal budget logic whether the amount of current or power being consumed is approaching, is at, or exceeds the assigned number of credits, and the determining by the dynamic thermal budget logic whether the amount of current or power being consumed is less than the assigned number of credits.

19. The system of claim 12, wherein:
the dynamic thermal budget logic is configured to reset the thermal budget so that each memory group is allocated a pre-determined quantity or fraction of the thermal budget; and
re-allocate the thermal budget across the various memory groups according to the instant power consumption or temperature of each memory group.

20. A system, comprising:
a bus;
a memory array coupled to the bus;
a plurality of memory groups in the memory array;
a switch coupled to each of the plurality of memory groups;
dynamic thermal budget logic coupled to the switch and configured to assign an equal number of credits to each of the plurality of memory groups in the memory array; and
measurement means coupled to the dynamic thermal budget logic and configured to detect at least one of an amount of current or power being consumed by each of the plurality of memory groups,
wherein the dynamic thermal budget logic is configured to determine whether the amount of current or power being consumed by a particular memory group from among the plurality of memory groups is less than the assigned number of credits for the particular memory group,
wherein in response to determining that the amount of current or power being consumed by the particular memory group is less than the assigned number of credits for the particular memory group, the dynamic thermal budget logic is configured to assign a decreased number of credits to the particular memory group, and the switch is configured to increase throttling of the particular memory group,
wherein the dynamic thermal budget logic is configured to determine whether the amount of current or power being consumed by a particular memory group from among the plurality of memory groups is approaching, is at, or exceeds the assigned number of credits for the particular memory group, and
wherein in response to determining that the amount of current or power being consumed by the particular memory group is approaching, is at, or exceeds the assigned number of credits for the particular memory group, the dynamic thermal budget logic is configured to assign an increased number of credits to the particular memory group, and the switch is configured to decrease throttling of the particular memory group.

21. The system of claim 20, wherein:
the measurement means is configured to detect, after a predetermined period of time, at least one of a second amount of current or power being consumed by each of the plurality of memory groups,
the dynamic thermal budget logic is configured to determine whether the second amount of current or power being consumed by a particular memory group from among the plurality of memory groups is less than the assigned number of credits for the particular memory group,
in response to determining that the second amount of current or power being consumed by the particular memory group is less than the assigned number of credits for the particular memory group, the dynamic thermal budget logic is configured to assign a decreased number of credits to the particular memory group, and the switch is configured to increase throttling of the particular memory group,
the dynamic thermal budget logic is configured to determine, after the predetermined period of time, whether the second amount of current or power being consumed by a particular memory group from among the plurality of memory groups is approaching, is at, or exceeds the assigned number of credits for the particular memory group, and
in response to determining that the second amount of current power being consumed by the particular memory group is approaching, is at, or exceeds the assigned number of credits for the particular memory group, the dynamic thermal budget logic is configured to assign an increased number of credits to the particular memory group, and the switch is configured to decrease throttling of the particular memory group.

22. The system of claim 20, wherein:
the dynamic thermal budget logic is configured to determine whether an amount of current or power being consumed by a first memory group from among the plurality of memory groups is approaching, is at, or exceeds the assigned number of credits for the first memory group, and
the dynamic thermal budget logic is configured to determine whether an amount of current or power being consumed by a second memory group from among the plurality of memory groups is approaching, is at, or exceeds the assigned number of credits for the second memory group.

23. The system of claim 22, wherein:
in response to determining that the amount of current or power being consumed by the first memory group is less than the assigned number of credits for the first memory group, the dynamic thermal budget logic is configured to assign a decreased number of credits to the first memory group, and the switch is configured to increase throttling of the first memory group, in response to determining that the amount of current or power being consumed by the second memory group is less than the assigned number of credits for the second memory group, the dynamic thermal budget logic is configured to assign a decreased number of credits to the second memory group, and the switch is configured to increase throttling of the second memory group, in response to determining that the amount of current or power being consumed by the first memory group is approaching, is at, or exceeds the assigned number of credits for the first memory group, the dynamic thermal budget logic is configured to assign an increased number of credits to the first memory group, and the switch is configured to decrease throttling of the first memory group, and in response to determining that the amount of current or power being consumed by the second memory group is approaching, is at, or exceeds the assigned number of credits for the second memory group, the dynamic thermal budget logic is configured to assign an increased number of credits to the second memory group, and the switch is configured to decrease throttling of the second memory group.

* * * * *